INVENTOR.
CHARLES H. BRAMMAR

United States Patent Office 2,807,230
Patented Sept. 24, 1957

2,807,230

APPARATUS FOR COATING PILLS AND TABLETS

Charles H. Brammar, Claymont, Del., assignor to Smith, Kline & French Laboratories, Philadelphia, Pa., a corporation of Pennsylvania Application March 11, 1954, Serial No. 415,667

2 Claims. (Cl. 118—19)

This invention relates to apparatus for coating tablets, pills, or the like, and, more particularly, relates to a coating pan having means providing for the ready discharge of its contents.

Coating pans are well known to the art. However, as heretofore known they are difficult to unload, particularly in the case where very large coating pans are used. In accordance with this invention there is provided means which readily unloads even very large coating pans in a very short period of time.

It is, therefore, the broad object of this invention to provide a coating pan having means for unloading the contents of the pan.

This and other objects of this invention will become apparent on reading the description in conjunction with the drawings, in which.

Figure 1:
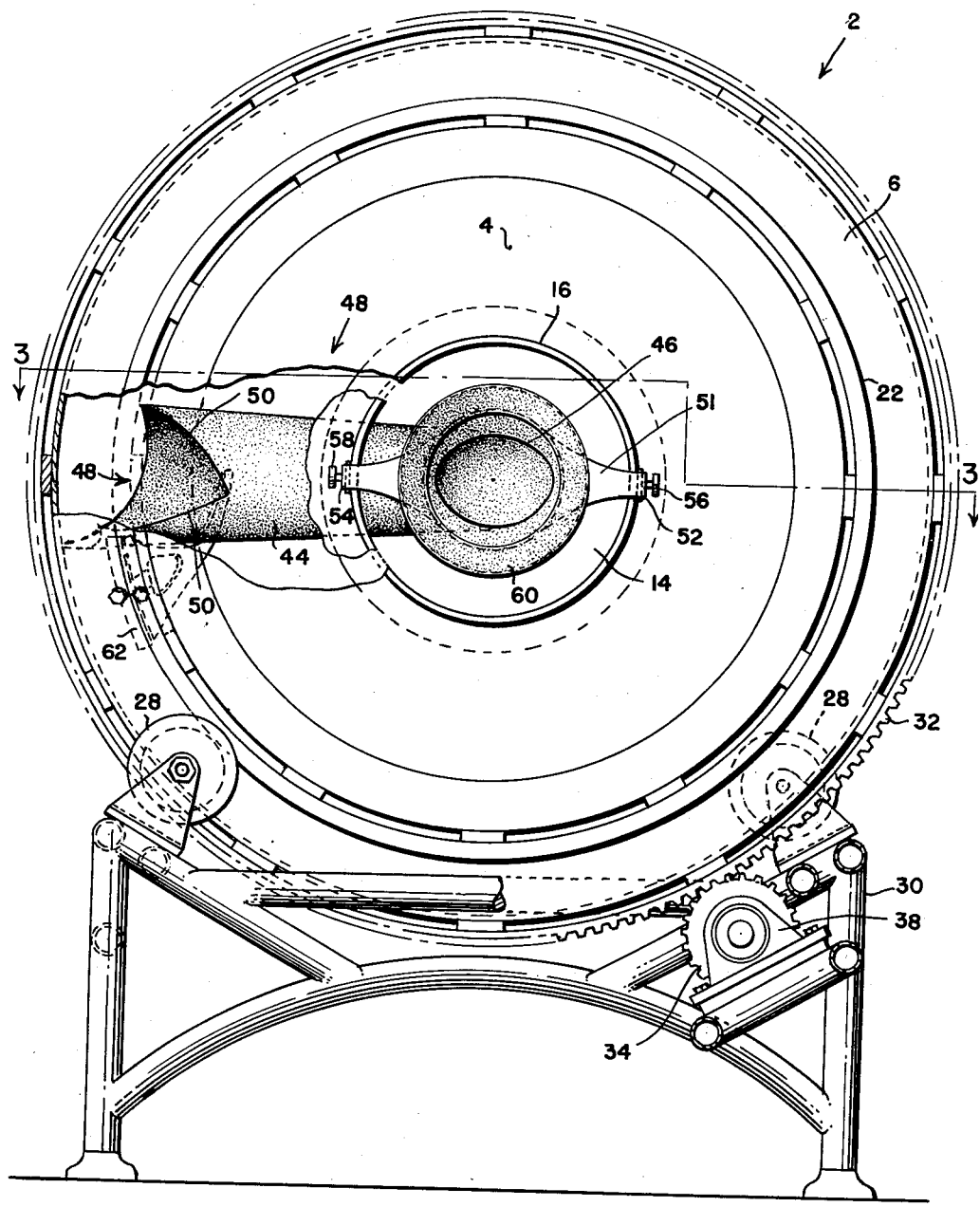
Figure 1 is a front elevation of a coating pan in accordance with this invention.

As shown in the figures, a coating pan 2 is formed from truncated cones 4, 6, 8 and 10 and cylindrical section 11. Truncated cones 4 and 6 and cylindrical section 11 and truncated cones 8 and 10 are secured together as, for example, by welding. An opening 12 is at one end of the coating pan and an opening 14 is at the opposite end, openings 12 and 14 having their centers on the axis of the coating pan. Each opening is provided with a bead 16 and a supporting frame 18.

The coating pan 2 is carried by tires 20 and 22 mounted on supporting brackets 24 and 26. Tires 20 and 22 are also each mounted on a pair of rollers 28, which are rotatably mounted on a support structure 30.

The coating pan 2 is driven through a gear 32 secured to the coating pan, which in turn is driven by a gear 34 connected with drive shaft 36, which is mounted in bearings 38. Shaft 36 is driven by any suitable motor (not shown). It will be noted that the coating pan is mounted for rotation on a horizontal axis.

The exemplary coating pan as described above is old in the art, being disclosed in Patent No. 2,652,805 and, therefore, need not be described in any greater detail.

Figure 2:
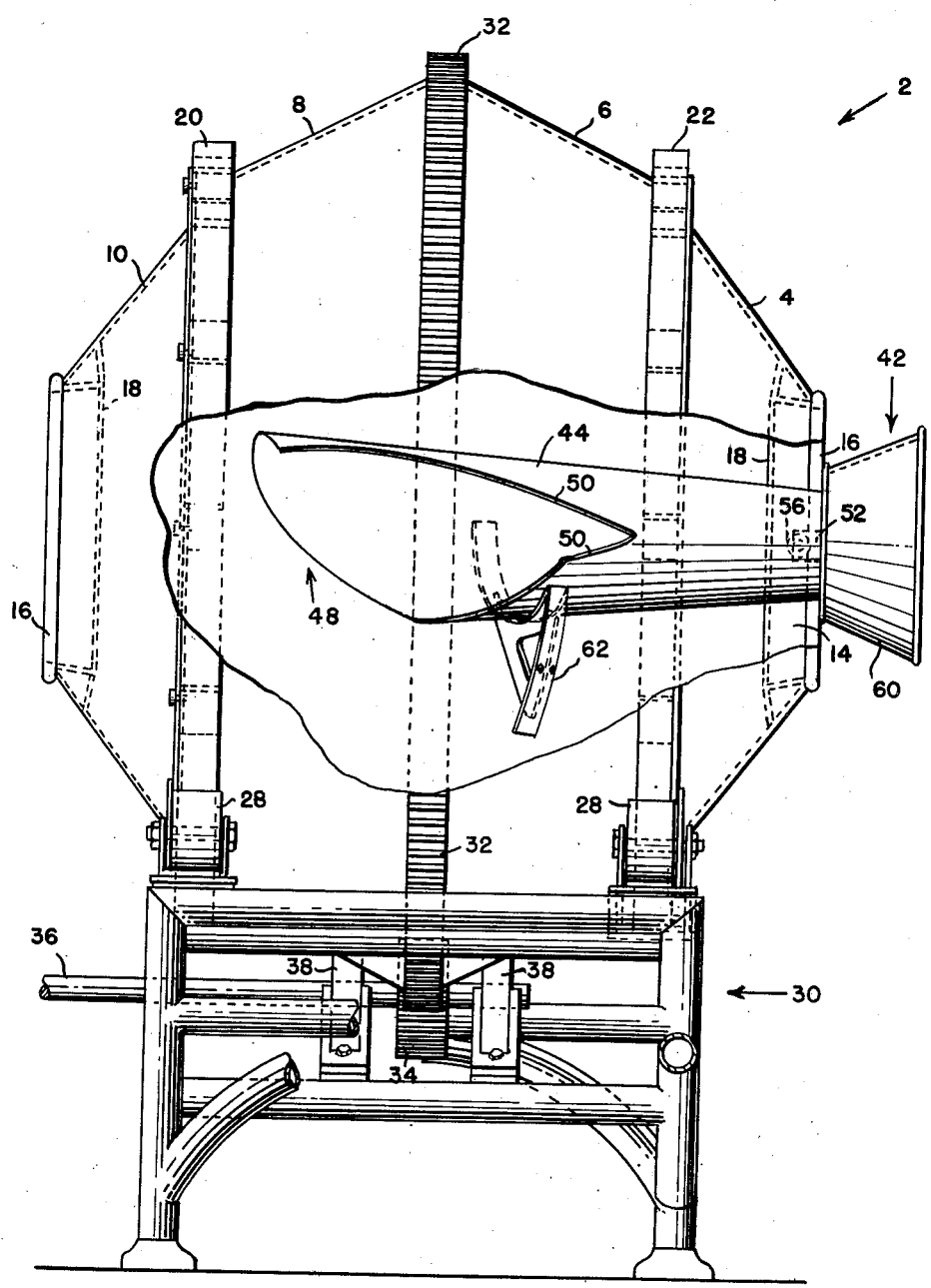
Figure 2 is a side view of the coating pan of Figure 1, partially broken away.
Figure 3:
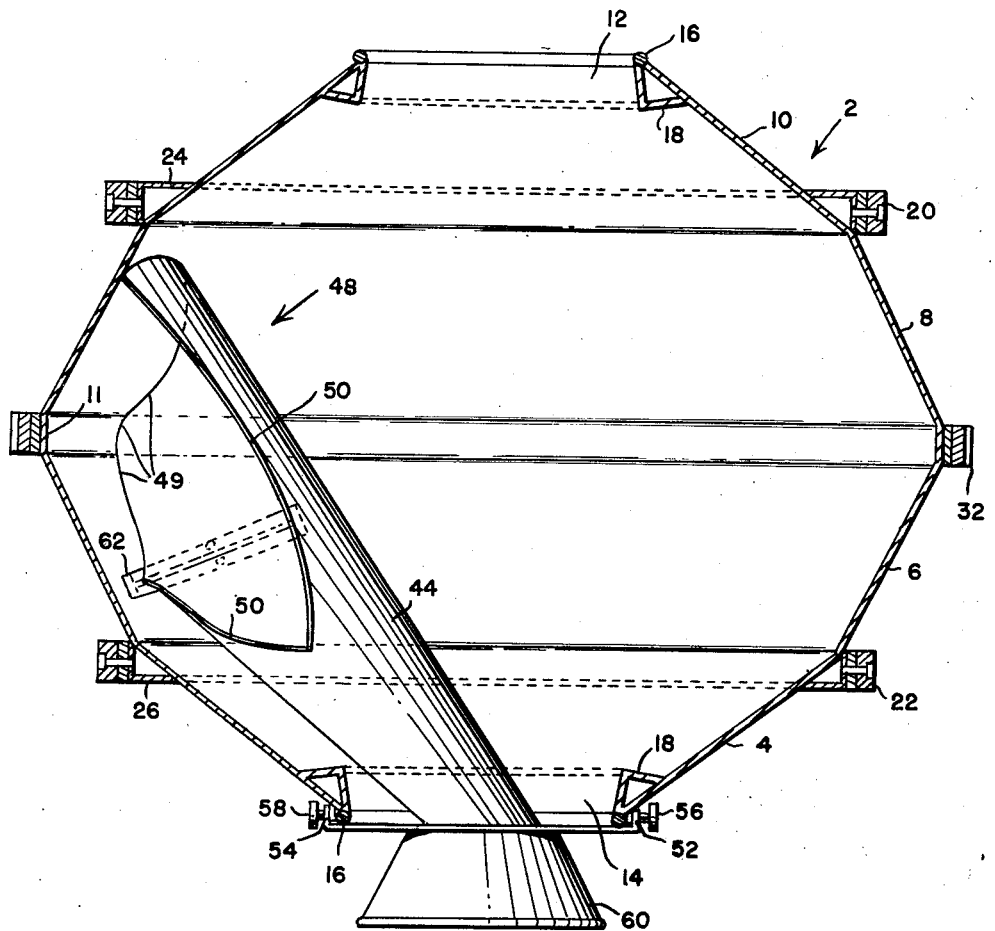
Figure 3 is a section taken on the line 3—3 of Figure 2.

The improvement in accordance with this invention comprises the addition of means to unload the contents of the coating pan. As shown in the figures, the coating pan 2 is provided with an unloading device 42. Unloading device 42 comprises a conduit 44 having the center of its discharge end 46 substantially centered in opening 14. Conduit 44 extends from opening 14 to the interior surfaces of truncated vones 6 and 8 and cylindrical section 11, the scoop end 48 of conduit 44 being developed so as to lie flat against the adjoining interior sides of truncated cones 6 and 8 and cylindrical section 11, as shown at 49. As indicated at 50, the scoop end 48 is completed by cutting away a portion of the upper part (as viewed in Figure 2) of conduit 44.

As shown in Figure 1, the conduit 44 being conical in shape and truncated at its discharge end 46, the discharge end 46 is elliptical in shape. End 46 of conduit 44 is encompassed by a double yoke member 51 having flanges 52 and 54 carrying set screws 56 and 58, respectively, the set screws being adapted to engage bead 16 of opening 14 to secure member 51 in place. A frustrated conical shaped member 60, having its axis on the axis of the coating pan, is secured to double yoke member 51. A bracket 62 bolted to truncated cone 6 is fixedly secured to conduit 44 and provides it with additional support.

During the conventional coating operation unloading device 42 is removed from coating pan 2. After the coating operation is completed, through the medium of bracket 62 and set screws 56 and 58, unloading device 42 is positioned while the coating pan is at rest. The coating pan is then rotated. After scoop end 48 has pointed downwardly and commences to move upwardly, a portion of the contents of the coating pan will fall into scoop end 48. As scoop end 48 moves further upwardly the contents in scoop end 48 will, by the force of gravity, be carried through conduit 44 and discharged through discharge end 46 into conical shaped member 60 and thence will fall, by force of gravity, into any suitable container (not shown). A repetition of this action will result in a rapid emptying of the coating pan.

From the above description it will be seen that the operability of this invention depends upon the scoop end of the unloading device being carried about in a circular path while the center of the discharge end remains substantially stationary. Where, as in the above described embodiment, the axis of rotation of the coating pan is horizontal, the axis of the conduit will of necessity be at a sufficient angle to the axis of the coating pan to effect the desired result. It will, of course, be understood that this invention is equally applicable when the axis of rotation of the coating pan is at an angle to the horizontal, in which event the angle between the axis of the conduit and the axis of rotation of the coating pan must be greater than the angle between the axis of rotation of the coating pan and the horizontal, how much greater will obviously depend upon the material in the coating pan which is to be discharged, the angle needing to be only sufficiently great to provide for gravitational flow.

It will further be appreciated that the sides of the frustrated conical shaped member 60 must extend at an angle to the axis of rotation of the coating pan which is greater than the angle between the horizontal and the axis of rotation of the coating pan to provide gravitational flow of the material to be discharged.

It is not desired to be limited except as set forth in the following claims.

What is claimed is:

1. In apparatus for coating pharmaceutical pills, tablets and the like comprising a rotatable coating pan having an open end substantially centered on the axis of rotation of said pan and means to rotate said pan about its axis, the improvement comprising a removable conduit for unloading material from said coating pan after the coating operation, and means to secure said conduit to the coating pan for continuous rotation with said pan, said conduit having a scoop end adjacent an interior side of the pan and a discharge end adjacent the open end of the pan and substantially centered on the axis of rotation of the pan, the angle between the axis of said conduit and said axis of rotation being greater than the angle between said axis of rotation and the horizontal to provide for a gravitational flow of said material.

2. In apparatus for coating pharmaceutical pills, tablets and the like comprising a rotatable coating pan having an open end substantially centered on the axis of rotation of said pan and means to rotate said pan about its axis, the improvement comprising a removable conduit for unloading material from said coating pan after the coating operation, means to secure said conduit to the coating pan for continuous rotation with said pan, said conduit having a scoop end adjacent an interior side of the pan and a discharge end adjacent the open end of the pan and substantially centered on the axis of rotation of the pan, the angle between the axis of said conduit and said axis of rotation being greater than the angle between said axis of rotation and the horizontal to provide for a gravitational flow of said material, and a member having the shape of a frustrated cone secured to the discharge end of said conduit and having its axis substantially on the axis of rotation.

References Cited in the file of this patent

UNITED STATES PATENTS

| | | |
|---|---|---|
| 1,665,519 | Webb | Apr. 10, 1928 |
| 1,923,303 | Fortier | Aug. 22, 1933 |
| 2,625,903 | Opie | Jan. 20, 1953 |
| 2,652,805 | D'Angelo | Sept. 22, 1953 |